United States Patent
Bonnett et al.

[19]

[11] Patent Number: 6,075,506
[45] Date of Patent: Jun. 13, 2000

[54] DISPLAY AND METHOD OF OPERATING A DISPLAY

[75] Inventors: Paul Bonnett; Michael John Towler, both of Oxford, United Kingdom; Akira Tagawa, Chiba, Japan

[73] Assignee: Sharp Kabushiki Kaisha, Osaka, Japan

[21] Appl. No.: 08/801,548

[22] Filed: Feb. 18, 1997

[30] Foreign Application Priority Data

Feb. 20, 1996 [GB] United Kingdom .................. 9603506

[51] Int. Cl.$^7$ ......................................... G09G 3/36
[52] U.S. Cl. .................... 345/89; 345/97; 345/101; 345/147
[58] Field of Search ............... 345/87, 88, 89, 345/94, 95, 97, 147, 148, 149, 101

[56] References Cited

U.S. PATENT DOCUMENTS

| | | | |
|---|---|---|---|
| 5,327,285 | 7/1994 | Faris | 359/483 |
| 5,469,281 | 11/1995 | Katakura et al. | 345/89 |
| 5,675,351 | 10/1997 | Kaneko et al. | 345/94 |
| 5,686,975 | 11/1997 | Lipton | 349/15 |
| 5,717,522 | 2/1998 | Hattori et al. | 359/465 |
| 5,751,479 | 5/1998 | Hamagishi et al. | 359/464 |

FOREIGN PATENT DOCUMENTS

| | | |
|---|---|---|
| 0453856 | 10/1991 | European Pat. Off. . |
| 0526095 | 2/1993 | European Pat. Off. . |
| 0710945 | 5/1996 | European Pat. Off. . |
| 5-27719 | 2/1993 | Japan . |
| 2294797 | 5/1996 | United Kingdom . |

OTHER PUBLICATIONS

P.W.H. Surguy et al., "Ferroelectrics", vol. 122 (1991), pp. 63–69.

J.R. Hughes et al., "Liquid Crystals", vol. 13, No. 4,597–601 (1993).

*Primary Examiner*—Dennis-Doon Chow
*Attorney, Agent, or Firm*—Renner, Otto, Boisselle & Sklar LLP

[57] ABSTRACT

A display such as a ferroelectric liquid crystal display includes a matrix of pixels, for instance formed at the intersections of data electrodes and strobe electrodes. In order to address an intermediate grey level, each pixel is switched from the normally black mode to the grey level in odd frames and from the normally white mode to the grey level in even frames. Variations in the grey levels, for instance caused by temperature variations, act in opposite directions so that the average grey level over time of the pixel varies relatively little.

10 Claims, 13 Drawing Sheets

FIG. 8 transmission level 43

FIG. 9 transmission level 43'

FIG. 10 transmission level 44

DISPLAY AND METHOD OF OPERATING A DISPLAY

TECHNICAL FIELD OF THE INVENTION

The present invention relates to a display, such as a liquid crystal display (LCD) and to a method of operating such a display.

BACKGROUND OF THE INVENTION

A known type of LCD panel comprises a matrix of picture elements (pixels), each of which is located at the Intersection of a strobe electrode and a data electrode: Displays of this type may use a ferroelectric liquid crystal (FLC) and, by applying sultable data and strobe signals, it is possible to display one or more grey levels having light transmissivity or reflectivity between minimum and maximum values which are referred to as black and white levels, respectively. This technique for achieving grey levels (by analogue means) may be used alone or in combination with spatial and/or temporal techniques for providing grey levels. It is thus possible to provide a large number of grey levels so as to increase the utility and range of applications of panel displays of this type.

A difficulty of achieving grey levels with displays of this type is that the grey levels are sensitive to variations in temperature, panel thickness i.e. thickness of the liquid crystal layer, and pixel pattern i.e. variations in switching sensitivity of each pixel as a result of data signals applied to other pixels. In the absence of compensation, temperature variations cause the grey levels to vary from the levels expected of the data signals. Although techniques are known for compensating for large scale changes in temperature affecting the whole of a display panel, grey levels are so sensitive to temperature variation that small temperature variations over the display area can have a substantial effect on grey levels. Similarly, relatively small thickness variations in the liquid crystal layer over a small scale within the panel, for instance resulting from manufacturing tolerances, can have a substantial effect on grey levels. Such effect therefore limit the number of grey levels which can be reliably addressed and can have a detrimental effect on the quality of images displayed by the display.

jP-A-5-27719 discloses a ferroelectric liquid crystal display of the pixellated type. Each pixel is physically divided Into two sub-pixels whose optical properties are individually controllable. In order to switch a pixel to a desired grey level, one of the sub-pixels is blanked to white and then switched from the white state so as to try to achieve the desired grey level. The other sub-pixel is blanked to black and then similarly switched so as to try to achieved the desired grey level. However, the effects of temperture variations and differences in thickness of the ferroelectric liquid crystal result in shifts of the function relating optical transmissivity to switching waveform. Both sub-pixels are affected in the same way but, because the sub-pixels are initially blanked to opposite states before being switched towards the desired grey level, the effects of such variations at least partially cancel out and the perceived grey level of the whole pixel is made substantially less dependent of variations, for instance in temperature or ferroelectric liquid crystal thickness. In particular, an effect which tends to make the grey level achieved by one sub-pixel darker than expected tends to make the other sub-pixel lighter than expected.

Although such a display is capable of compensating for temperature variations and variations in ferroelectric liquid crystal thickness, extra electrodes are required for addressing all of the sub-pixels. This limits the spatial resolution which may be achieved by such a display because some of the achievable spatial resolution has to be sacrificed in order to form the sub-pixels. Also, extra drivers and connections are required as the number of row or column electrodes has to be doubled in order to provide the sub-pixels for a given size of pixel matrix.

SUMMARY OF THE INVENTION

According to the invention, there is provided a display comprising a plurality of pixels, each of which has first and second optical states, characterised by a control arrangement for selectively switching each pixel to an intermediate optical state by switching the pixel from the first optical state to the intermediate optical state in a first time period and from the second optical state to the intermediate optical state in a second time period consecutive with the first time period.

The first and second time periods may be odd and even frames of display data. Each pixel therefore acts as a first sub-pixel during the first time period and a second sub-pixel during the second time period. The grey level displayed by each pixel is perceived as the average grey levels of the sub-pixels. By switching the sub-pixels in opposite directions, the effects of temperature, and thickness can be reduced or cancelled out. In particular, any such effect which causes a selected grey level during one frame to increase and in the next frame to decrease can be at least partially compensated for so that the effect on the perceived pixel grey level is substantially reduced and possibly eliminated i.e. made imperceptible. The full spatial resolution of the display is available for displaying images. This is achieved without increasing the number of electrodes and electrode drivers.

Preferably the first, second and intermediate states are black, white and grey states, respectively. The black and white states correspond to minimum and maximum optical transmissivity, respectively, and provide easily addressable and stable states from which the pixels may be switched towards the desired grey level.

The pixels may comprise liquid crystal display pixels, although other types of display may also be used.

The first and second time periods preferably comprise consecutive frame refresh periods.

Preferably the pixels are arranged in rows and the control arrangement is arranged to refresh all of the pixels in each row simultaneously.

According to a further aspect of the invention, there is provided a method of operating a display having a plurality of pixels, comprising selectively switching each pixel to an intermediate optical state by switching the pixel from a first optical state to the intermediate optical state. In a first time period and from a second optical state to the intermediate optical state in a second time period consecutive with the first time period.

Analogue grey levels can therefore be reliably addressed and this makes it possible to address larger numbers of grey levels so as to increase the grey scale capability of a display. Such analogue techniques may be combined with spatial and temporal dither techniques to provide a large number of grey levels, thus increasing the utility and range of applications of displays, such as LCDs.

BRIEF DESCRIPTION OF THE DRAWINGS

The invention will be further described by way of example, with reference to the accompanying drawings, in which.

DESCRIPTION OF THE PREFERRED EMBODIMENTS

Figure 1:
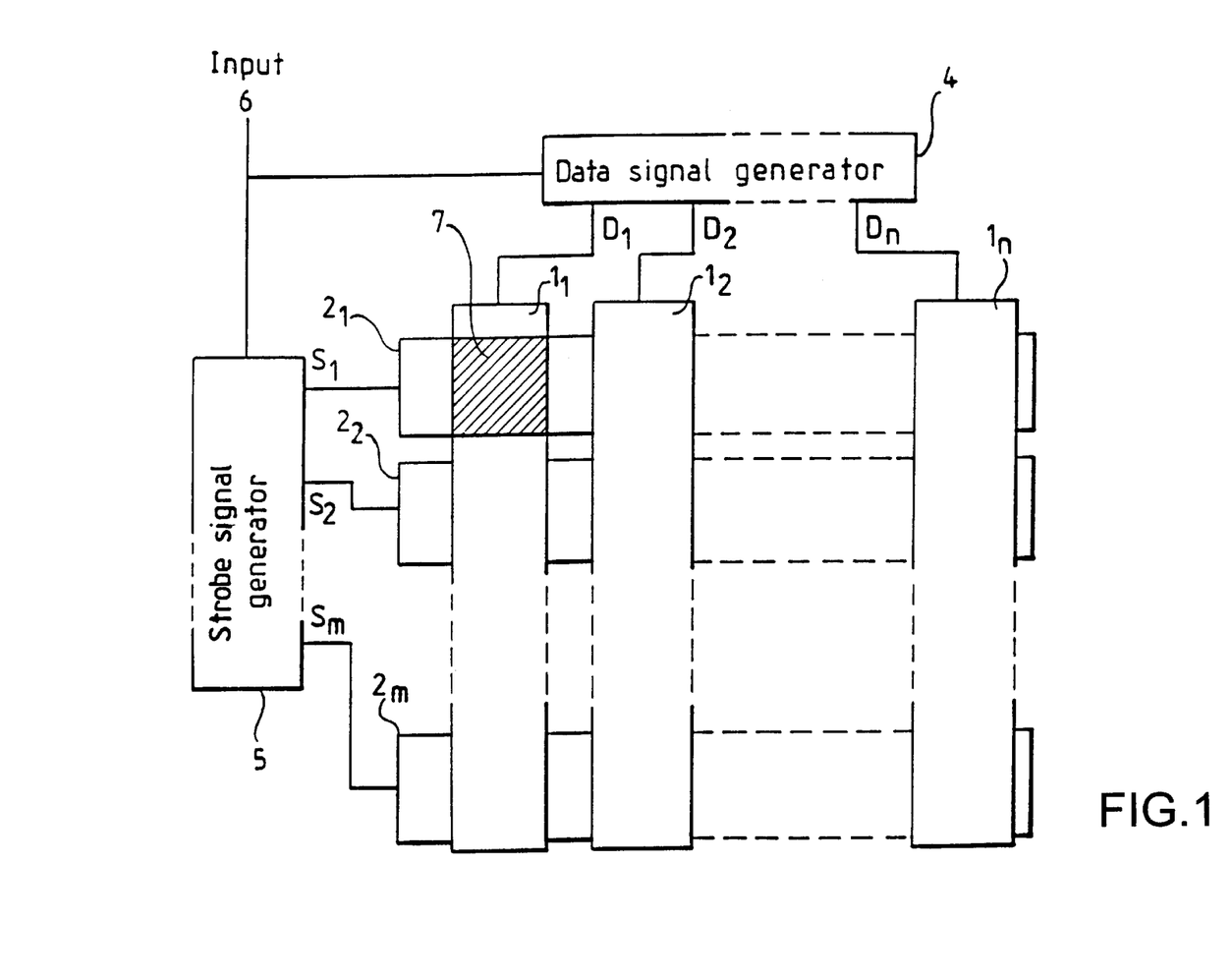
FIG. 1 is a schematic diagram of a liquid crystal display constituting a first embodiment of the invention.

FIG. 1 shows part of an LCD comprising a matrix of pixels such as 7 formed at the intersections of n data or column electrodes $1_1$, $1_2$, . . . $1_n$ and m strobe or row electrodes $2_1$, $2_2$, . . . $2^m$. The data electrodes $1_1$, $1_2$, . . . $1_n$ are connected to a data signal generator 4 from which they receive data signals $D_1$, $D_2$, . . . $D_n$ whereas the strobe electrodes $2_1$, $2_2$, . . . $2^m$ are connected to a strobe signal generator 5 from which they receive strobe Signals $S_1$, $S_2$ . . . $S_m$. The data and strobe signal generators 4 and 5 are connected to a display input 6 which supplies image data to the data signal generator 4 and clock signals to the generators 4 and 5.

The LCD shown in FIG. 1 further comprises a liquid crystal layer with alignment layers disposed between the data electrodes 1 and the strobe electrodes $2_1$, $2_2$, . . . $2^m$. Polarisers and other devices are also provided but these parts are not shown in FIG. 1 for the sake of clarity. The liquid crystal in the display shown in FIG. 1 is a ferroelectric liquid crystal.

Figure 2A:
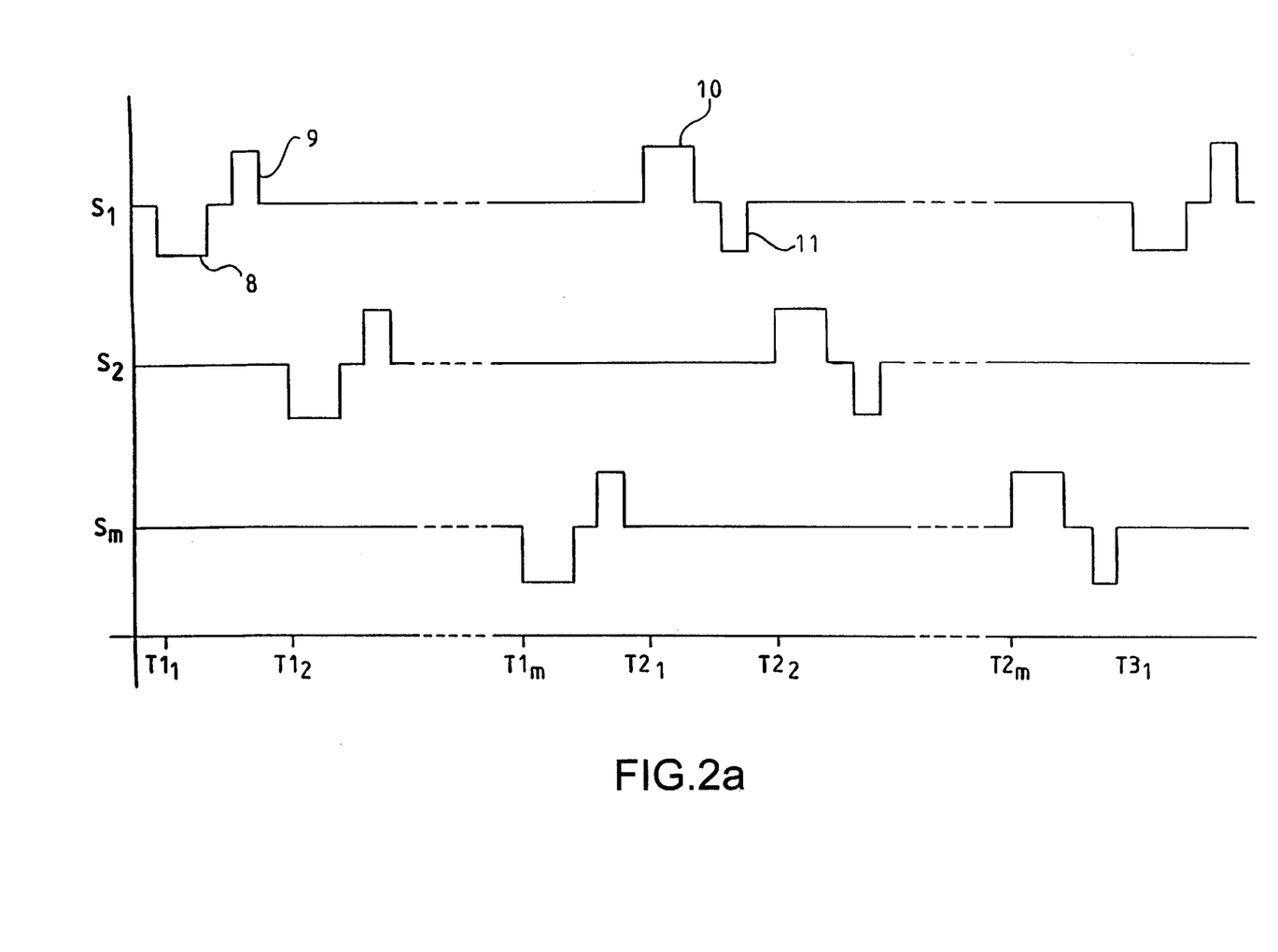
FIGS. 2a and 2b illustrate strobe and data waveforms which occur in the display of FIG. 1.

FIG. 2a illustrates the form, timing and polarity of the strobe signals $S_1$, $S_2$, . . . $S_m$. The display data are arranged in frames such that each frame contains data for refreshing all the pixels 7 of the display. Fresh frames of data are supplied consecutively for display. Within each frame, the pixels are refreshed with new display data one row at a time starting with the pixels associated with the top strobe electrode $2_1$, and finishing with the pixels associated with the bottom strobe electrode $2_m$.

As shown in FIG. 2a, in order to refresh the pixels 7 of the display with a first frame of display data, a strobe signal $S_1$ is supplied to the strobe electrode $2_1$ at a time $T1_1$. The strobe signal comprises a negative blanking pulse 8 followed by a positive strobe pulse 9. The negative blanking pulse 8 has the effect of switching all of the pixels addressed by the electrode $2_1$ to the black level. Data signals $D_1$, $D_2$, . . . $D_n$ are supplied simultaneously by the data signal generator 4 to the data electrodes $1_1$, $1_2$, . . . $1_n$, respectively, and in synchronism with the strobe pulse 9. The row of display data is thus entered in the row of pixels addressed by the strobe electrode $2_1$. Details of the data signals are given hereinafter.

Once the first row of data has been entered into the display panel, the strobe signal $S_1$ ends and, at time $T1_2$, the strobe signal $S_2$ is applied to the second row of strobe electrode $2_2$. The strobe signal $S_2$ is of the same form as the strobe signal $S_1$ so that the row of pixels is blanked to black and the display data are then entered simultaneously in the pixels and in synchronism with the strobe pulse.

The remaining strobe signals are applied in sequence to the strobe electrodes until the last strobe signal $S_m$ is applied at time $T1_m$. Refreshing of the display with the next frame of display data then begins at time $T2_1$. The strobe signal $S_1$ is again applied to the strobe electrode $S_1$. However, in the second frame, the strobe signals are inverted so that each comprises a positive blanking pulse 10 followed by a negative strobe pulse 11. Accordingly, at the start of each line address time, the row of pixels being addressed is, first blanked to the white state, after which the strobe pulse and the data signals switch the optical states of the pixels to the desired grey level.

In order to compensate for effects such as local temperature or thickness variations, the image data supplied during each odd frame is repeated during each subsequent even frame. Thus, each pixel 7 of the display receives strobe and data signals in consecutive odd and even frames which are intended to control the pixel to the same grey level. However, in the odd frame, the optical state of the pixel is switched from its black state towards the desired grey level whereas, in the subsequent even frame, the pixel is switched from its white state towards the desired grey level. Thus, each pixel may be considered as being a first sub-pixel during each odd frame and a second sub-pixel during the subsequent even frame because the pixel is intended to display the same image data i.e. the same grey level, in both frames.

Figure 2B:
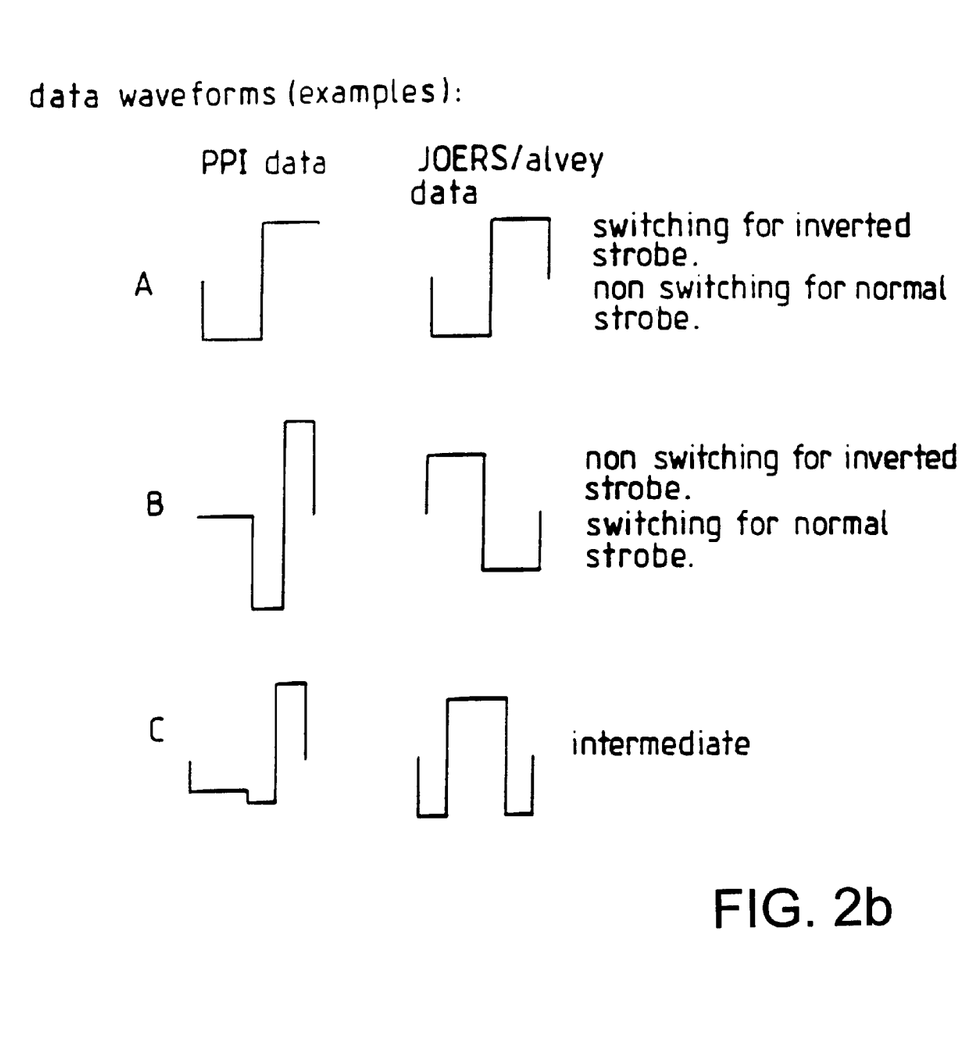

FIG. 2b illustrates examples of data waveforms which may be used with the strobe waveforms illustrated in FIG. 2a. The waveforms shown under tho label "PPI Data" are pixel pattern independent data pulses which may be used to reduce grey level variations caused by pixel pattern. Pulses of this type are disclosed in EP 0 710 945. The next column illustrates data waveforms of the type known as JOERS/Alvey as disclosed in P.W.$H_1$ Surguy et al, Ferroelectrics 122, 63, 1991. These may be phase shifted to achieve grey level addressing, for example. However, other suitable data waveforms, such as the Malvern set, disclosed in J. R. Hughes,. E. P. Raynes, Liquid Crystals, 13, S97, 1993, may also be used.

The data waveforms in the row A have the effect, in combination with the "inverted" strobe pulses 11, of switching the state of the pixels 7 from white to black but, in combination with the "normal" strobe pulses 9, are non-switching pulses for the pixels 7, which therefore remain in the black state. The pulses in the row 8 in combination with the strobe pulses 9 switch the pixels from the black state to the white state but, in combination with the strobe pulses 11, do not switch the pixels which therefore remain in the white state. The pulses in the row C are intermediate pulses which, in combination with the strobe pulses 9 and 11, switch the pixels from their black and white states to an intermediate grey state which is intended to be of the same transmissivity in the absence of the effects of temperature variations and cell thickness variations.

Figure 3A:
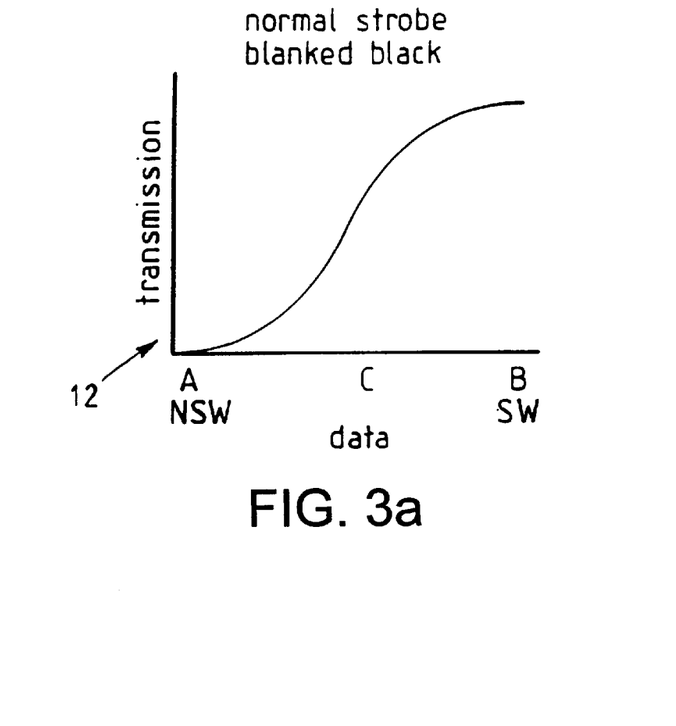
FIG. 3 shows graphs of light transmission against data waveforms for first and second sub-pixels of the display of FIG. 1.
Figure 3B:
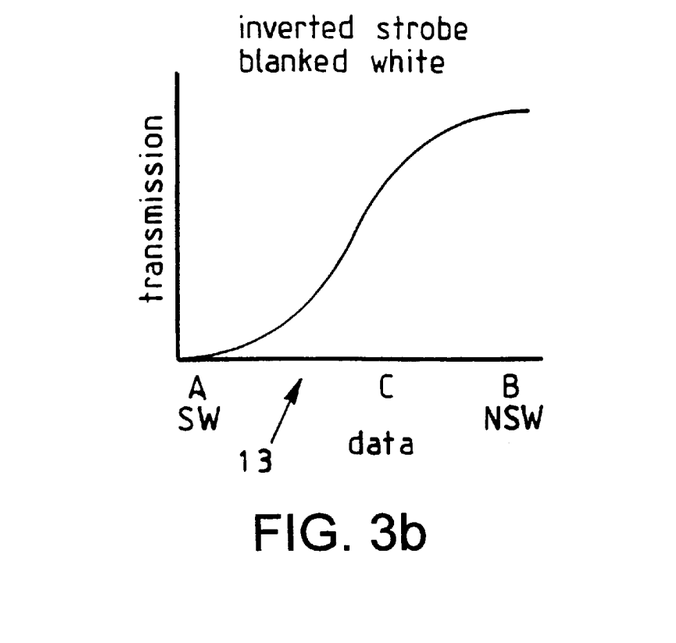

FIG. 3 shows graphs 12 and 13 illustrating optical transmission of the pixels 7 for a range of data pulses for addressing black, white and intermediate grey levels. The data waveforms shown in the rows A, B and C in FIG. 2b are marked on the horizontal axes, The drive points for the pixels 7 are preferably chosen so that the slopes of the curves in the graphs 12 and 13 are as similar as possible. There is a continuous range of intermediate data waveforms, such as that illustrated in the row C in FIG. 2b, which may be used to select a continuous range of grey levels. By making the curves in the graphs 12 and 13 as similar as possible, the intermediate data waveforms select grey levels in the pixels 7 which are similar or substantially identical. The frame repetition rate is such that the grey levels produced by the pixels 7 in consecutive odd and even frames are integrated by the eye of an observer so that the grey level is the average of the grey levels of each pixel in the individual frames.

Figure 4A:
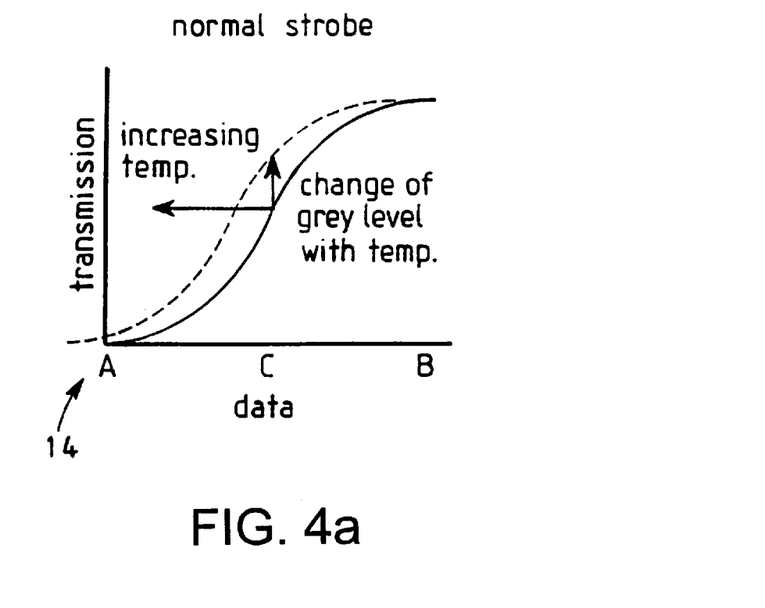
FIG. 4 is similar to FIG. 3 but illustrates the effects of temperature variations.
Figure 4B:
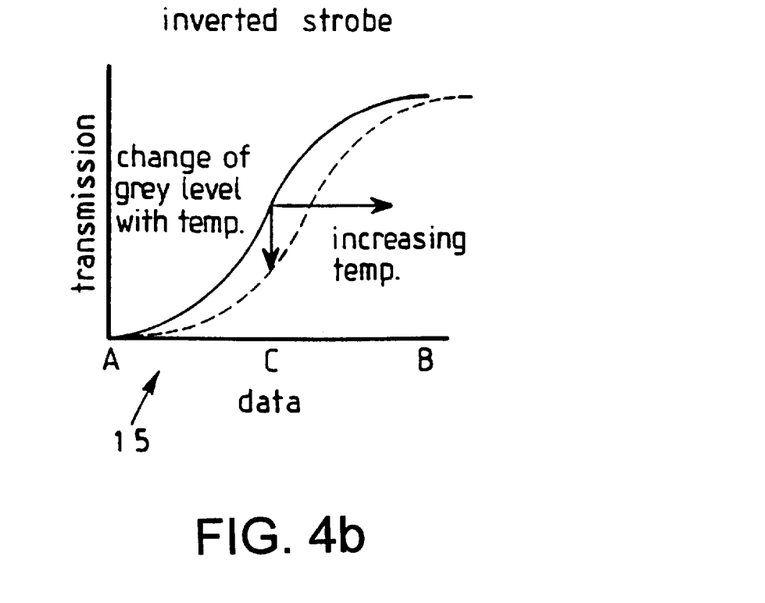

FIG. 4 illustrates the effects of temperature on the curves shown in FIG. 3. In particular, the graph 14 illustrates the effect of increasing temperture on the pixels in the odd frames whereas the graph 15 illustrates the effect of increasing temperature on the pixels in the even frames. When using the data waveforms in the row C in FIG. 2b to select an intermediate (50%) grey level, increasing temperature causes the curve to shift to the left so that the grey level of the pixels in the odd frames actually selected by the data waveform C is lighter than the desired 50% grey level. For the pixels in the even frames, the curve in the graph 15 moves to the right with increasing temperature so that the data waveform C selects a grey level which is darker than the desired 50% grey level. The actually selected grey levels in consecutive odd and even frames are integrated by the eye of the observer so that the perceived grey level of the pixel 7 is substantially equal to the desired 50% grey level.

The transmission curves shown in FIGS. 3 and 4 are substantially horizontal for the data waveforms A and B so that the black and white levels are not substantially affected by variations in temperature. If the slopes of the transmission curves for the odd and even frames are the same, the selected average grey level remains substantially constant as temperature changes.

When using the pixel pattern independent (PPI) data waveforms shown in FIG. 2b, only one data type is required so that pixel patterning Is reduced. However, the "inverted" pixel pattern set is generally slower than the normal pixel pattern set so that the durations or the voltages of the strobe signals 9 and 11 may be adjusted so that switching occurs using the same strobe pulse durations and amplitudes in consecutive frames. The strobe signals 9 and 11 do not need to be of the same duration or amplitude but the data signals are the same for consecutive odd and even frames.

These difficulties may be overcome in various ways. For instance, the normal and inverted strobe signals may be of the same time length although this would require that the time would he slower than the fastest rate at which the normal strobe could operate. Alternatively, the normal strobe signal could be slowed down by moving the strobe pulse closer to the blanking pulse compared with the inverted strobe signal, Another possibility is that the inverted strobe signal could be speeded up by extending it relative to the normal strobe.

Figure 5A:
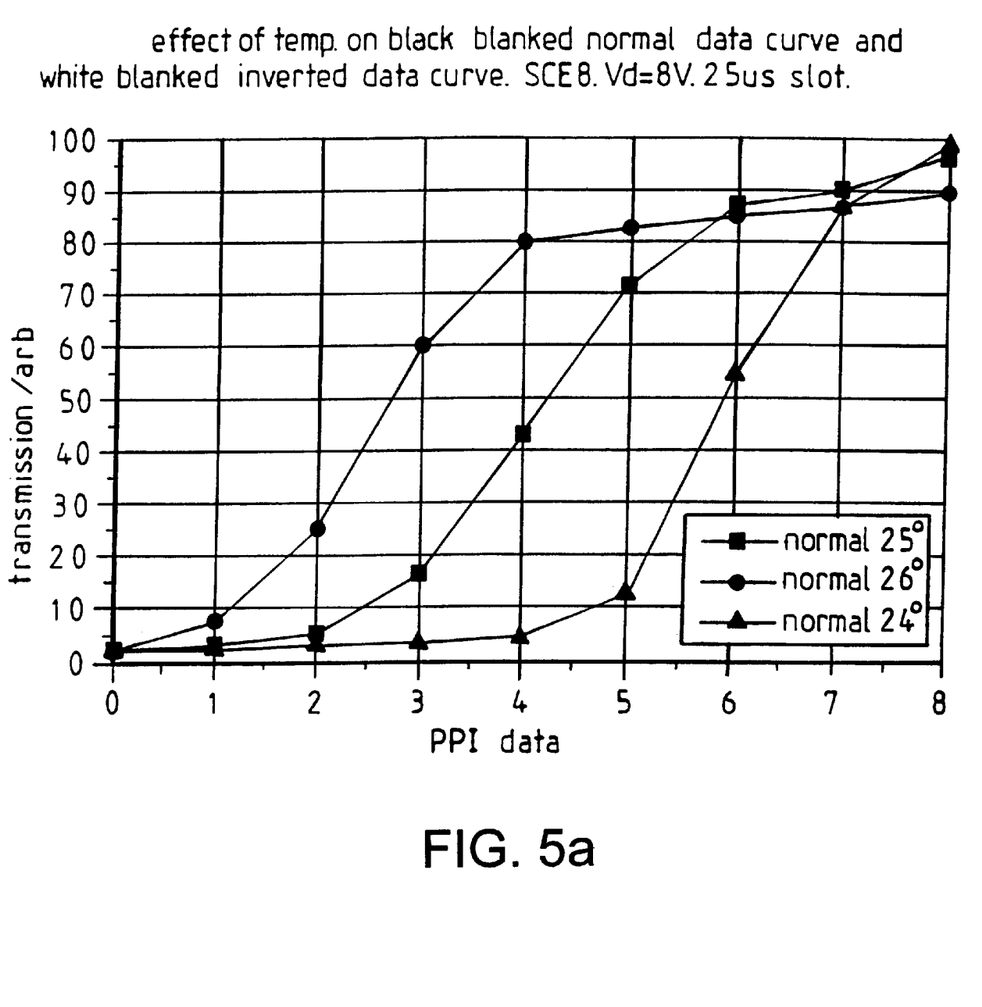
FIG. 5 is similar to FIG. 4 but shows actual measurements of an example of the display of FIG. 1.
Figure 5B:
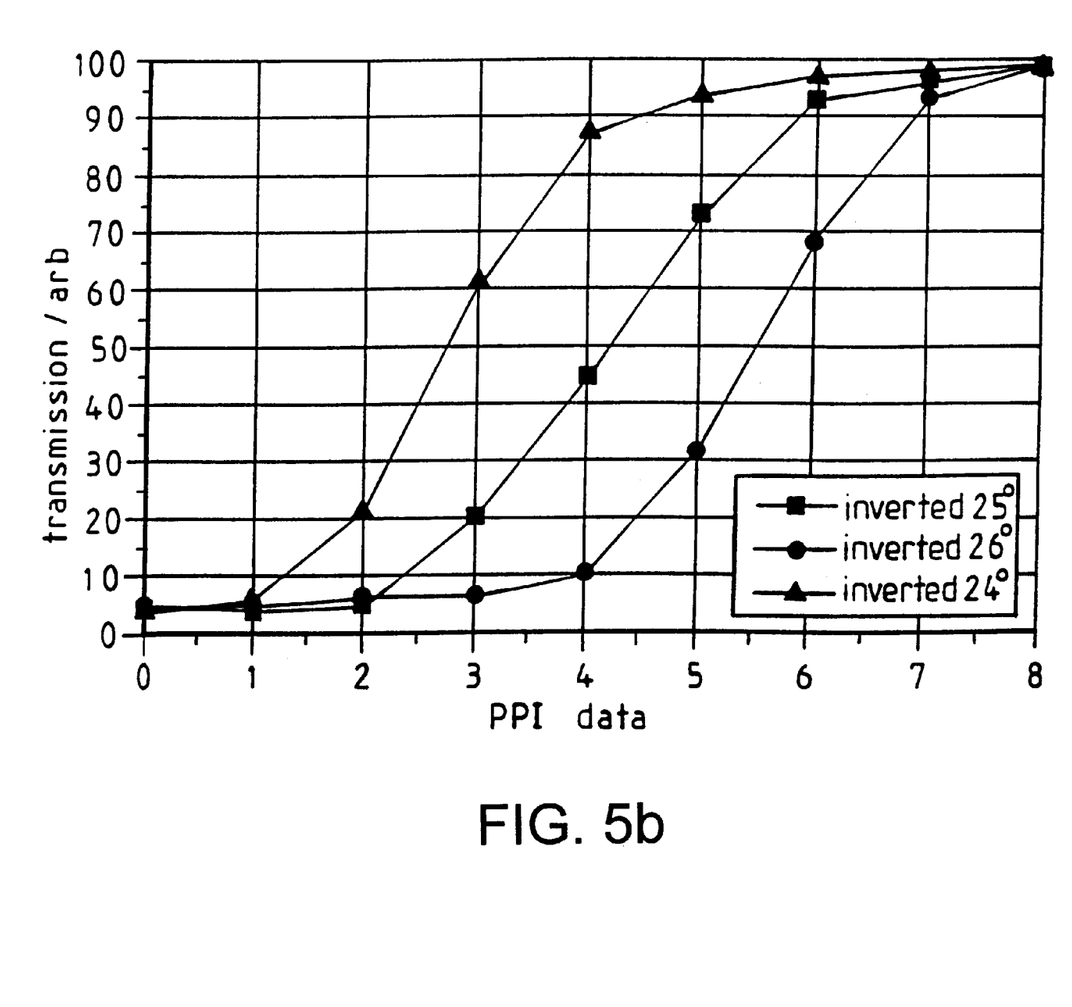

FIG. 5 illustrates the performance of an example of the display shown in FIG. 1 using an FLC material known as SCE 8. The curves shown in the graphs in FIG. 5 were obtained using measurements at 24, 25, and 26° C. as illustrated by the points indicated by black triangles, black squares, and black circles, respectively. The upper curves relate to the odd frames with the normal strobe signals 9 whereas the lower curves relate to the even frames with the inverted strobe signals 11. The strobe pulse for the normal strobe signal 9 had an amplitude of 44 volts and was extended by two time slots whereas the strobe pulse for the inverted strobe signal 11 had an amplitude of 43.4 volts and was extended by four slots to maintain a constant slot time of 2.5 micro seconds. These curves illustrate the high degree of temperature sensitivity of the grey levels.

Figure 6:
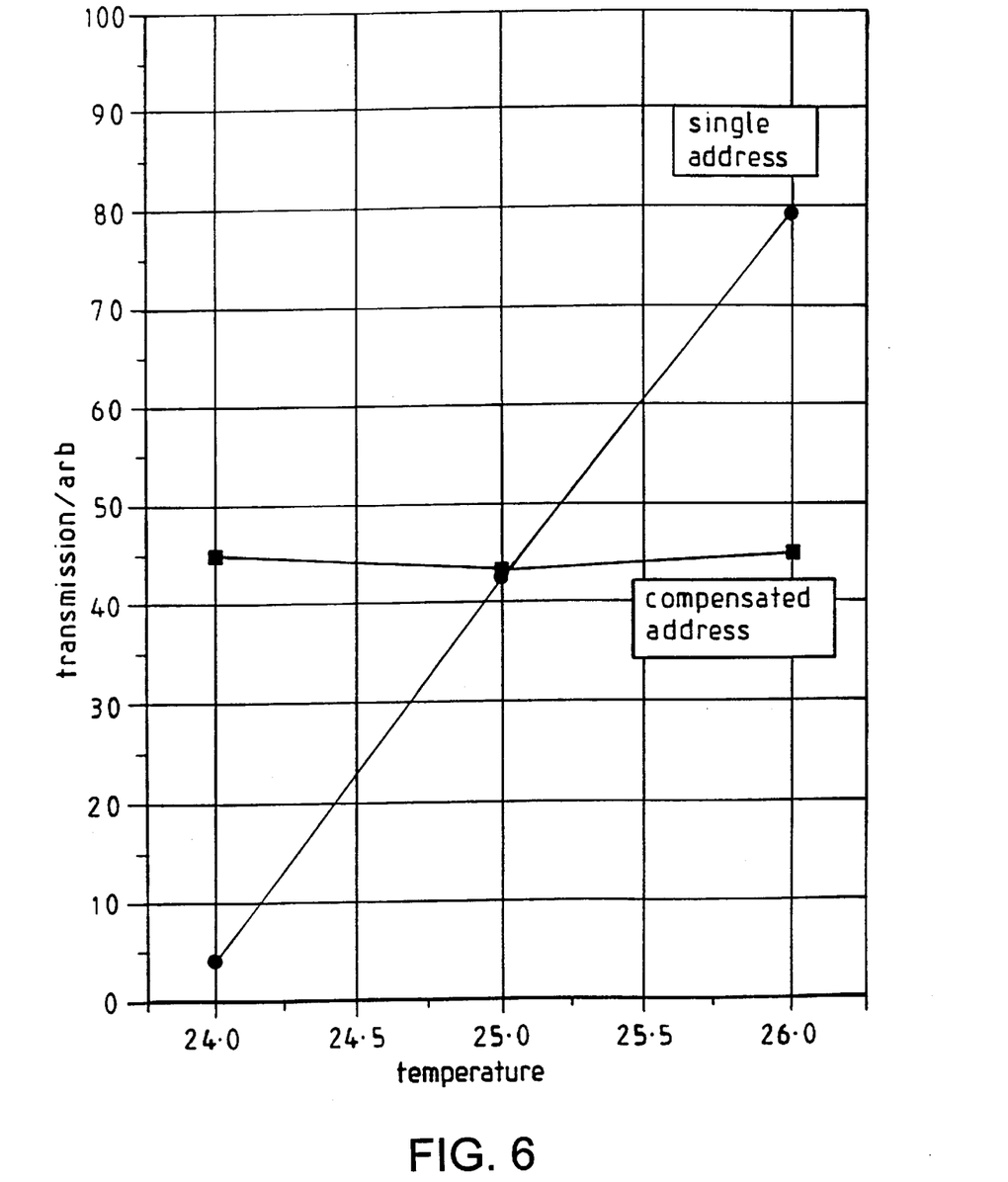
FIG. 6 shows a graph of light transmission against temperature in ° C. illustrating variation in a 50% grey level against temperature for the example of the display of FIG. 1 and for a known uncompensated display.

FIG. 6 compares the performance of the "compensated address" technique illustrated in FIGS. 1 and 2 with the same display operating with the normal strobe waveform 8 and 9 supplied during all frames so as to simulate a conventional uncompensated type of display. A 50% grey level was selected and, as shown In FIG. 6, the variation in grey level for the compensated display over a temperature range of 24 to 26° C. was only a few percent whereas, over the same temperature range, the grey level of the uncompensated display varied from approximately 5% to approximately 80%. The data pulses were of the PPI type having an amplitude of 8 volts (RMS).

Figure 7:
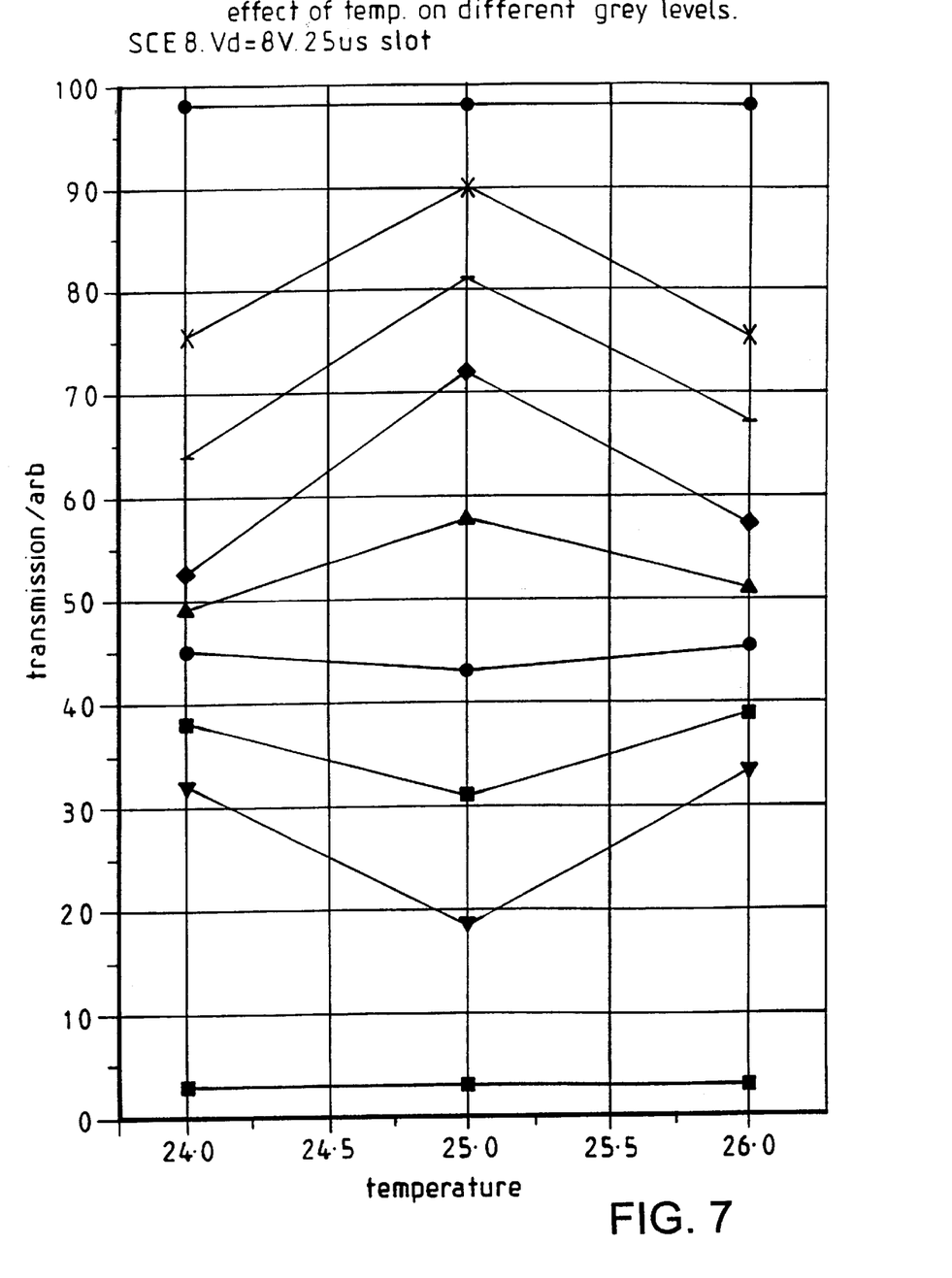
FIG. 7 shows graphs similar to those of FIG. 6 but illustrating the variations in several grey levels with respect to temperature for the example of the display.

FIG. 7 illustrates compensated operation of the same display using a variety of PPI waveforms for a variety of grey levels. The black and white levels are little affected by temperature. The intermediate grey levels show some variation as the temperature varies away from the "design" temperature of 25° C. and tend towards the 50% grey level because each pixel in the odd frames tends towards the white state whereas each pixel in the even frames tends towards the black state as temperature changes. However, the curves for the intermediate grey levels do not cross or overlap each other so that there is no tendency towards "image inversion".

Other known techniques are used for compensating for large scale temperature variations of the whole display panel. By using the technique described hereinbefore to compensate for changes in grey level with temperature, small scale temperature variations across the display panel can be compensated so as to reduce the variation in grey level.

This technique may be used to compensate for variations which are caused by other effects and which shift the transmission curves in odd and even frames in opposite directions. Thus, variations in grey level caused by and variations in cell thickness can be substantially reduced.

Although displays of this type are required to operate at twice the frame. refresh rate of equivalent conventional displays, the full spatial resolution of the display is available and no extra drivers are required. Provided the refresh rate is sufficiently rapid to avoid the visibility of flicker, the eye of an observer integrates the grey levels of the pixels in consecutive frames so as to perceive the average grey level.

In order to reduce the grey level temperature dependence using FLCs, materials with low temperature dependence of Vmin and τmin are preferably used. Also, the slope of the transmission curve as illustrated in FIG. 3 should not be too steep. The slope of the curve may be reduced by selecting the appropriate drive point and/or using fast addressing techniques, such a the Malvern data waveform set. Alternatively, the cell structure of the display may be chosen so as to reduce the transmission curve slope, for instance using multi-thickness or wedge cells or fringe cells.

Figure 8:
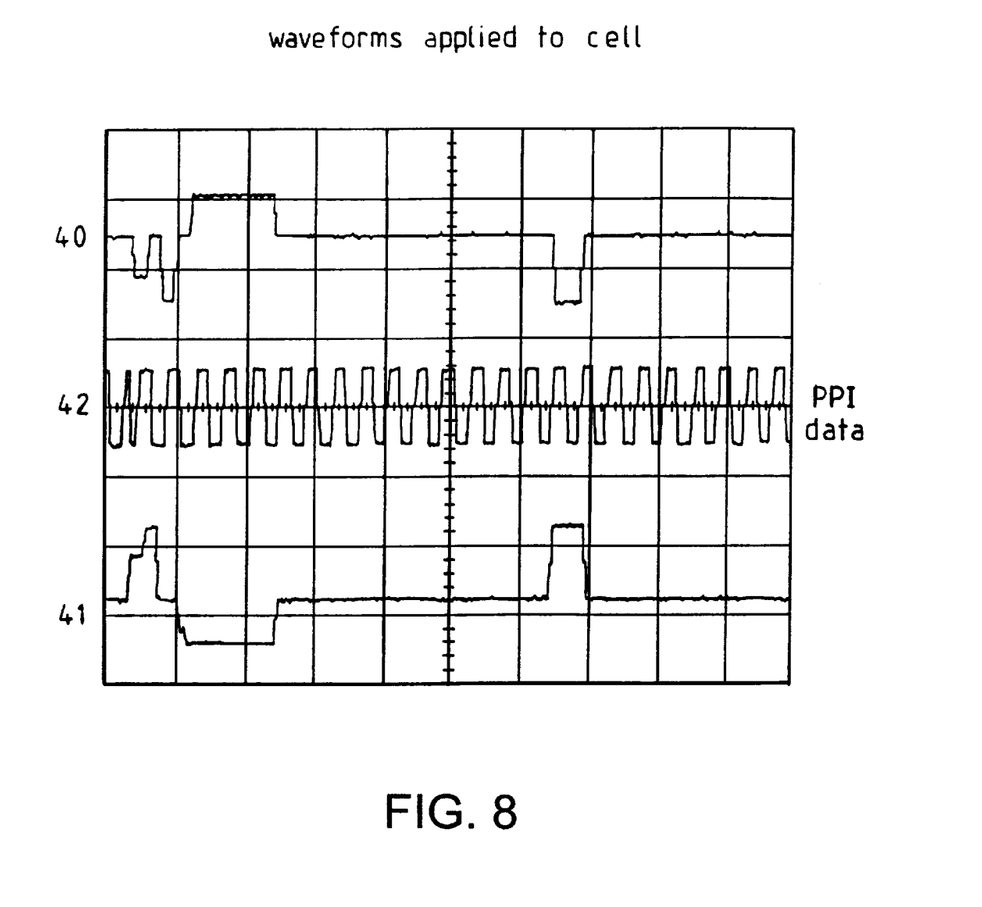
FIG. 8 shows actual waveforms applied to the example of the display shown in FIG. 1.

FIG. 8 illustrates actual waveforms produced by the generators 4 and 5 of the display shown in FIG. 1. Curves 40 and 41 illustrate the normal and inverted strobe waveforms, respectively, whereas curve 42 illustrates a PPI data waveform. The sub-pixels were 100 micrometers wide and were separated by 10 micrometer gaps.

Figure 9:
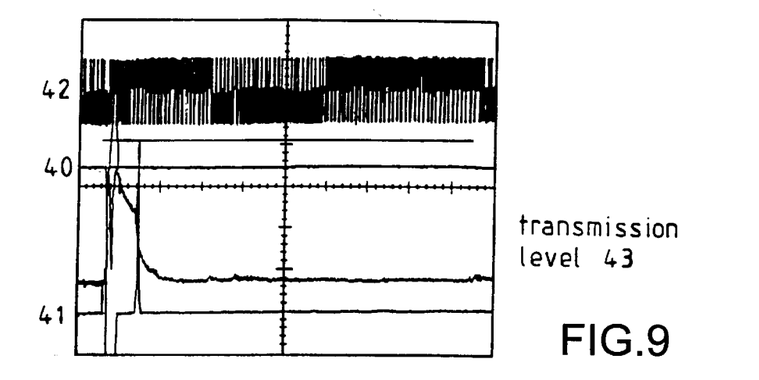
FIG. 9 is a graph showing actual waveforms and measured light transmission for a dark state or level of the display shown in FIG. 1.
Figure 10:
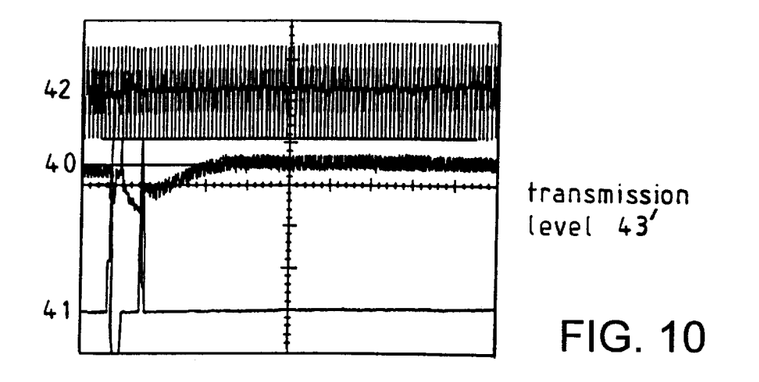
FIG. 10 is a graph similar to that of FIG. 9 for a light state or level.
Figure 11:
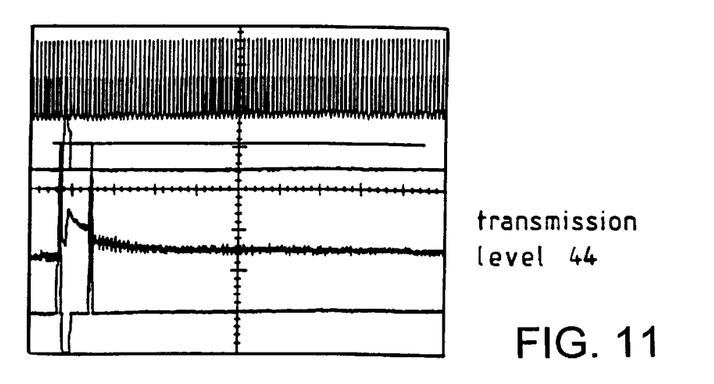
FIG. 11 is a graph similar to those shown in FIGS. 9 and 10 for, an intermediate grey state or level.

FIGS. 9 to 11 illustrate operation of this display at a temperature of 25° C. The measured dark or "black" transmission level is shown at 43 in FIG. 9 whereas the measured light or "white" transmission level is shown at 43' in FIG. 10. FIG. 11 shows the integrated measure level 44 for an intermediate grey level.

Figure 12:
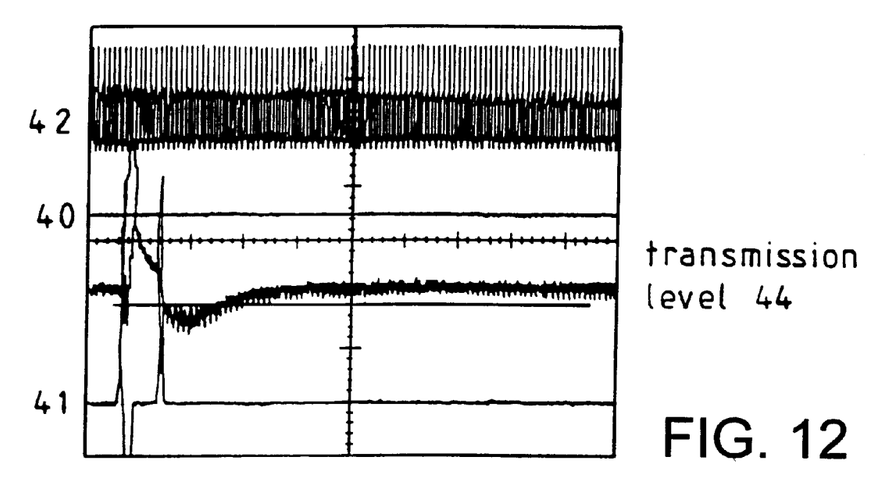
FIGS. 12 and 13 are graphs similar to that shown in FIG. 11 for different temperatures.
Figure 13:
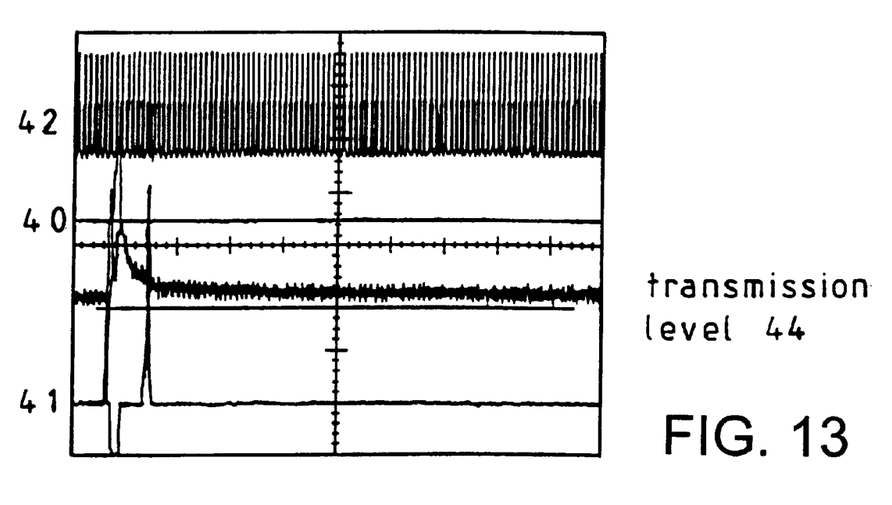

FIGS. 12 and 13 correspond to FIG. 11 but show the measured performance at 24 and 26° C., respectively. AS shown by the transmission levels 44 in FIGS. 11 to 13, the grey level of the pixel exhibits only very small variations with temperature.

Figure 14:
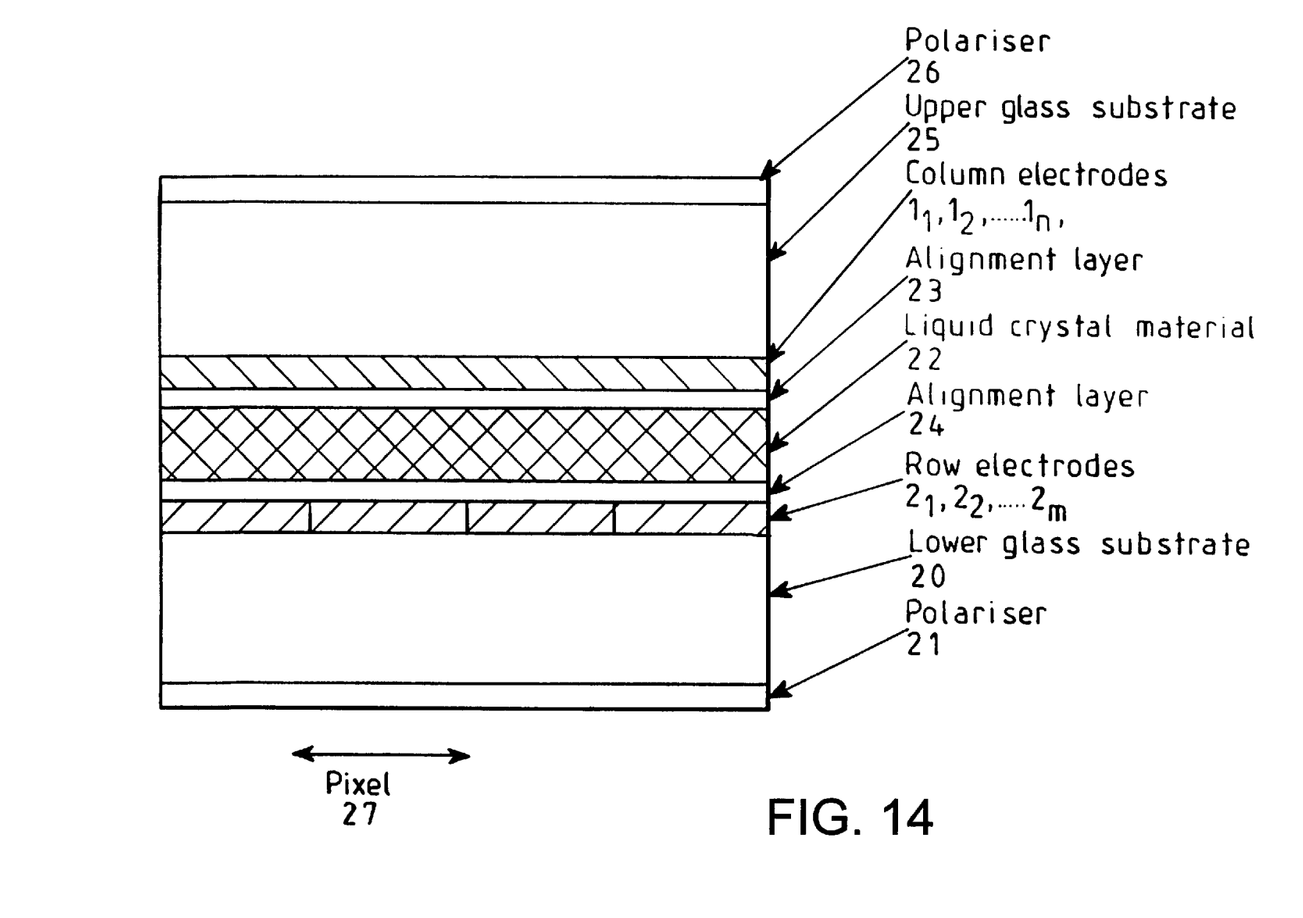
FIG. 14 is a cross-sectional view of the display shown in FIG. 1.

The example of a display for which the results shown in FIGS. 9 to 13 were obtained used a normal strobe waveform of the "Malvern 2" type of magnitude 29.6 volts and an inverted strobe of the Malvern 2.5 type of magnitude 41.2 volts. PPI data waveforms having an amplitude of 8 volts (RMS) and a time slot of 20 micro seconds were used, The cross-sectional view shown in FIG. 14 illustrates the positions of the column electrodes $1_1, 1_2, \ldots 1_n$ and the row electrodes $2_1, 2_2, \ldots 2_m$. In relation to other components of the display. Thus, the display comprises a lower glass substrate 20 disposed between the row electrodes and a polariser 21. A layer of liquid crystal material 22 is disposed between upper and lower alignment layers 23 and 24, which are disposed between the column and row electrodes. An upper glass substrate 25 is disposed between the column electrodes and a polariser 26. The extent of a pixel is illustrated at 27.

Although only liquid crystal displays have been described, the same techniques may be applied to other types of display which suffer from shifts in transmission curve.

What is claimed is:

1. A display comprising:

a plurality of pixels, each of which has first and second optical states; and a control arrangement for selectively switching each of the plurality of pixels to the first optical state in a first time period and to the second optical state in a second time period consecutive with the first time period, and switching each of the plurality of pixels to an intermediate optical state by switching the pixel from the first optical state to the intermediate optical state in the first time period and from the second optical state to the intermediate optical state in the second time period.

2. A display as claimed in claim 1, wherein the first, second and intermediate states are black, white and grey states, respectively.

3. A display as claimed in claim 1, wherein the plurality of pixels comprise liquid crystal display pixels.

4. A display as claimed in claim 1, wherein the first and second time period comprise consecutive frame refresh periods.

5. A display as claimed in claim 1, wherein the pixels are arranged in rows and the control arrangement is arranged to refresh all of the pixels in each row simultaneously.

6. A display as claimed in claim 1, further comprising a plurality of data electrodes and a plurality of strobe electrodes, wherein the pixels are respectively arranged at intersections of the data electrodes and the strobe electrodes, and each of the first and second time periods is a period required to sequentially address all of the strobe electrodes.

7. A display as claimed in claim 6, wherein in each of the first and second time periods, each of the strobe electrodes receives one addressing pulse preceded by a blanking pulse, and the blanking pulse causes the pixels to switch to the first optical state in the first time period and to the second optical state in the second time period.

8. A method of operating a display having a plurality of pixels, comprising the steps of:

selectively switching each of the pixels to a first optical state in a first time period and to a second optical state in a second time period consecutive with the first time period; and switching each of the pixels to an intermediate optical state by switching the pixel from the first optical state to the intermediate optical state in the first time period and from the second optical state to the intermediate optical state in the second time period.

9. A method as claimed in claim 8, wherein the display further comprises a plurality of data electrodes and a plurality of strobe electrodes, the pixels being respectively arranged at intersections of the data electrodes and the strobe electrodes, and each of the first and second time periods is a period required to sequentially address all of the strobe electrodes.

10. A method as claimed in claim 9, further comprising the step of, in each of the first and second time periods, applying one addressing pulse to each of the strobe electrodes, wherein the addressing pulse is preceded by a blanking pulse which causes the pixels to switch to the first optical state in the first time period and to the second optical state in the second time period.

* * * * *